United States Patent [19]

Bly

[11] 4,423,927

[45] Jan. 3, 1984

[54] OPTICAL, TEMPORAL BANDPASS FILTER

[75] Inventor: Vincent T. Bly, Alexandria, Va.

[73] Assignee: The United States of America as represented by the Secretary of the Army, Washington, D.C.

[21] Appl. No.: 304,504

[22] Filed: Sep. 22, 1981

[51] Int. Cl.$^3$ .......................... G02F 1/13; G02F 1/133
[52] U.S. Cl. ................. 350/331 R; 350/352; 350/342; 350/335
[58] Field of Search .............. 350/331 R, 330, 334, 350/342, 345, 346, 347 R, 347 V, 347 E, 351, 352, 335

[56] References Cited

U.S. PATENT DOCUMENTS 3,679,290  7/1972  Adams et al. .................. 350/352
3,824,002  7/1974  Beard ............................ 350/342

OTHER PUBLICATIONS

Levenson, "Color-Mask Plate for Color Liquid Crystal Displays", *IBM Technical Disclosure Bulletin* vol. 24, No. 8, p. 4036, Jan. 1982.

*Primary Examiner*—John K. Corbin
*Assistant Examiner*—David Lewis
*Attorney, Agent, or Firm*—Robert P. Gibson; Milton W. Lee; Max L. Harwell

[57] ABSTRACT

A twisted nematic liquid crystal optical, temporal bandpass filter device for transmitting optical images only having the time response near a given frequency. The device is comprised of two linear dichroic polarizers with orthogonal polarities at the input and output of the device and two twisted nematic liquid crystal light valves and a relay lens between the light valves. Each of the two light valves has a different time response and has opposite rotary direction handedness of the twist within the nematic liquid crystal cells. That is, the liquid crystal material in the cells is homogeneously aligned with 90° twist between the front and back thin alignment insulator surfaces and the cells have counter untwisting of the polarized light.

An a.c. voltage is applied across each cell with proper frequencies and proper liquid crystal cell thicknesses to insure that one of the light valves has a faster time response so that only the frequencies of the optical light image within the time based modulation of the faster cell but about the passband of the slower will be transmitted out the device since the slower cell has not counter twisted and cancelled the untwisting effect of the faster cell.

14 Claims, 1 Drawing Figure

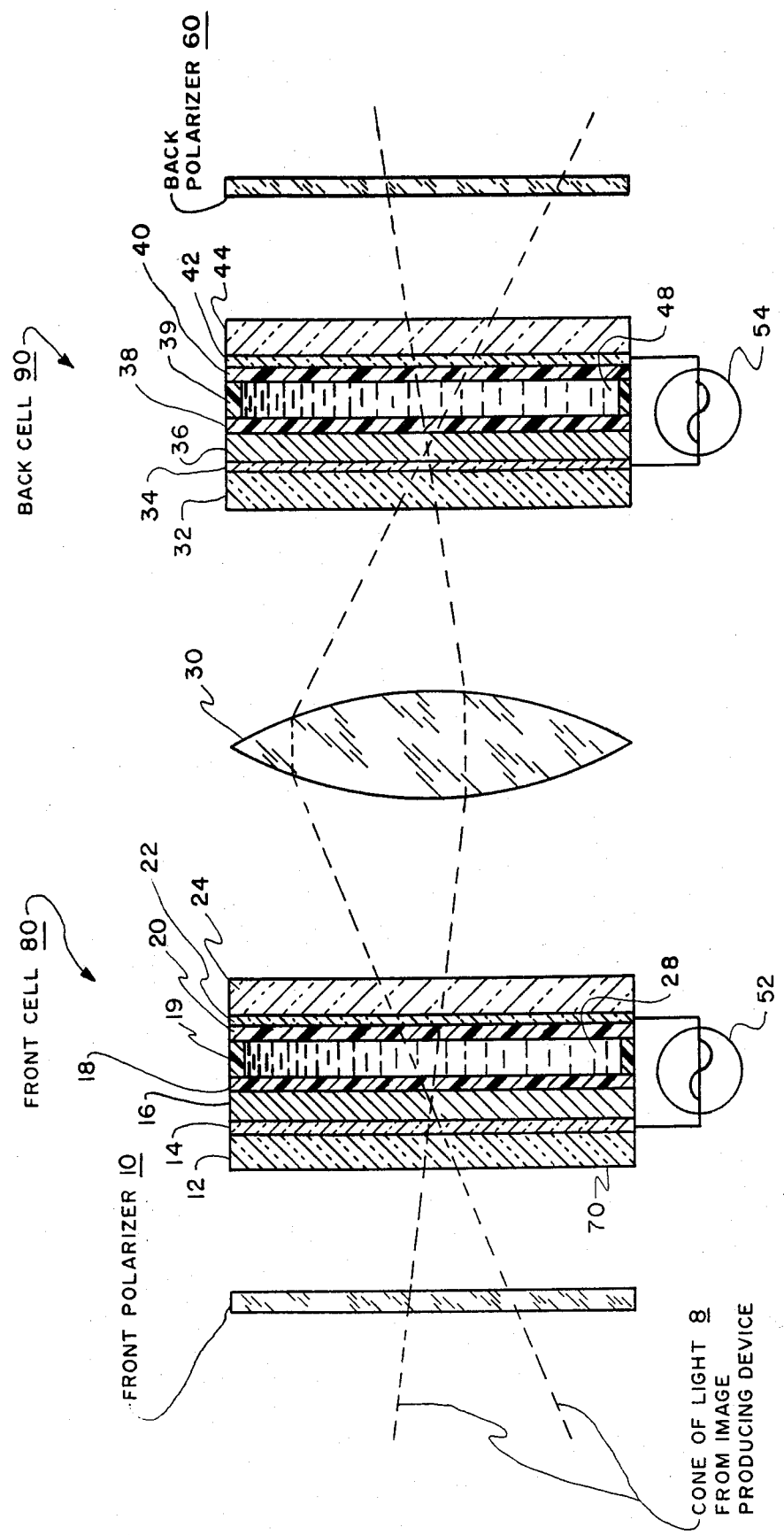

OPTICAL, TEMPORAL BANDPASS FILTER

The invention described herein may be manufactured, used, and licensed by the U.S. Government for governmental purposes without the payment of any royalties thereon.

BACKGROUND OF THE INVENTION

1. Field of the Invention

The invention relates to an optical display device comprised of two different time response transmissive twisted nematic liquid crystals operating in conjunction with two polarizers for transmitting only an optical image with time base modulation near a given frequency.

2. Description of the Prior Art

Twisted nematic liquid crystal devices requiring modest voltage driving requirements have recently been used in light-controlling displays. Prior to the use of the twisted nematic liquid crystals, most liquid crystal displays used the dynamic scattering phenomenon wherein scattering was induced by ionic flow in a thin film of a moderate-resistivity nematic liquid crystal. The requirement for current flow in the dynamic scattering led to some concern over lifetime of the device. More emphasis has therefor been placed on liquid crystal displays based on field effects in high resistivity liquid crystals, such as the action of an electric field in quenching the optical activity in the twisted nematic liquid crystal cell display devices. In the twisted nematic cells the two electrode surfaces are treated so that the liquid crystal molecules are aligned with their long axes parallel to a specific direction in the plane of the electrode surface. The specific directions of the alignment of the liquid crystal molecules in the two electrode surfaces are positioned orthogonal to each other, so that there is a progressive twist in the molecular axis across the twisted nematic liquid crystal cell which serves to rotate the plane of polarization of plane-polarized incident light. This optical activity can be quenched by applying voltages to the electrodes causing an electric field across the cell, which by the intrinsic molecular dielectric anisotropy causes the molecules to stand on end and thus effectively destroys the twist, or stated another way to untwist the molecules.

SUMMARY OF THE INVENTION

The present invention uses two transmissive twisted nematic liquid crystal light valves in optical alignment, wherein one of the light valves has a faster time response than the other to form an optical, temporal bandpass filter device for transmitting optical light images therethrough that only have time based modulation near a given frequency. That given frequency is determined as being any part of the optical image having time based modulation within the passband of the faster liquid crystal cell but above the passband of the slower liquid crystal cell, since in that part of the image the slower cell has not had time to counter untwist the untwisting effect of the faster cell. The bandpass filter device of the present invention may be used for time based modulation of the optical light images near a given frequency, such as in object motion detection as moving target identification, for use in conjunction with other equipment for incoherent low spatial frequency filtering, and for thermal-to-visible systems.

The filter device is comprised of two linear dichroic polarizers, two twisted nematic liquid crystal light valves, and an optical relay lens between the light valves. The two linear dichroic polarizers, designated front and back polarizers, have 90° out of phase polarities. The front polarizer may be considered a vertical polarizer and the back polarize a horizontal polarizer. The two twisted nematic liquid crystal light valves, designated front and back cells, have opposite rotary direction handedness. The front and back polarizers are positioned respectively outside the front and back light valves. Each of the light values are comprised of two plane glass plates, designated forward and rearward glass plates and preferably made of optical glass free of strains, which form the liquid cell. Transparent electrodes are deposited on the interior surfaces of the forward and rearward glass plates, and are designated respectively forward and rearward transparent electrodes. A partially transparent photoconductive layer is deposited on the forward transparent electrode. Thin alignment insulator layers, which are designated forward and rearward thin alignment insulator layers, are deposited respectively on the photoconductive layer and the rearward transparent electrode. The thin alignment insulator layers have insulator shims, preferably made of nylon or teflon, across the ends thereof in which the thin insulator layers combined with the shims enclose the twisted nematic liquid crystal cell. The liquid crystal material in the cell is nematic at room temperature.

A means for simultaneously applying different frequency a.c. voltages is provided across the forward and rearward transparent electrodes of each liquid crystal cell to cause faster untwisting of the established twist in one liquid crystal cell than in the other liquid crystal cell. The front cell will be explained herein as the faster cell. The a.c. voltages may be, as examples, 30 KHz for the faster cell and 10 KHz for the slower cell with both voltages at from 20 to 100 volts rms. Also, to help provide the time response difference for the two cells the faster cell may have a liquid crystal cell thickness of about 5 $\mu$m whereas the liquid crystal cell thickness of the slower cell should be 10 $\mu$m and thicker, perhaps up to 50 $\mu$m thick, to aid the lower frequency a.c. voltage in providing a slower response. However, it should be noted that it is not necessary to have two a.c. frequency, but a typical source of say 20 KHz used with cells of 5 $\mu$m and 10 $\mu$m thickness may be sufficient for proper responses.

Material from which the different elements of the light values may be made are preferably as follows. The transparent electrodes may be made of tin oxide, indium-tin-oxide, or a thin layer of gold. The photoconductive layers may be cadmium-selfide, cadmium-selenide, or cadmium-sulfide-selenide of from 2 $\mu$m to 12 $\mu$m thick which has a sensitivity in the visible spectrum and has a dark resistivity of about 0.2 M $\Omega$m$^2$ wherein optical activity by the optical light image causes local drops in resistivity according to the original local light intensity distribution of the optical light image. The thin alignment insulator layers may be made of silicon oxide of from 1000 Å to 5000 Å thick. The surfaces of the thin alignment insulator layers that are in direct contact with the liquid crystal material are first treated, preferably by rubbing, to align the crystal structure at the sides of the liquid crystal cell so that the liquid crystal molecules adjacent to each surface will be parallel to one direction on the surface. The parallel orientation of the two thin alignment insulator layers are set 90° from each other so that in the relaxed state with no applied field the orientation of molecules twist through a quarter turn from one insulator layer surface to the other. In other words the liquid crystal material is homogeneously aligned in the liquid crystal cell with a 90° twist. The liquid crystal material should be nematic at a wide temperature range about room temperature. Various liquid crystal materials will meet the criterion such as, 4'-methoxybenzylidene-4-butylaniline (MBBA), a binary of 4'-ethyoxybenzylidene-4-n-butylaniline (MBBA:EBBA) of 60 mole percent:40 mole percent, ternary and quarternary mixtures of nematic liquid crystals, or MBBA mixtures saturated with hexadecyltrimethylammonium bromide. The optically active area of the cells may be about 2 cm$^2$. Positive dielectric anisotrophy nematic liquid crystal materials are preferred but may also be negative dielectric anisotrophy materials.

Time responses are in accordance with the materials that the liquid crystal cell is comprised of and its geometry plus the frequency of the excitation voltage. Each cell therefore has a built in sensitivity of twist at the passband of interest in which the speed of response of the faster cell may have already untwisted the optical light but the slower cell has not had time to respond and produce the opposite handedness of untwist to the faster cell. Once each cell starts the untwist, the degree of untwist relative to the original local image intensity is matched. The light that has a time response within the passband of the faster cell but still above the passband of the slower cell is transmitted through the present filter device, but no other light will be transmitted therethrough. Note that for time response above that of the faster cell, no light is transmitted since neither cell has had time to respond and the two orthogonal polarizers block the light. Also note that for the static image case, or for time response below that of the slower cell, both cells have had time to react and therefor cancel each other and the two polarizers again block the light.

The invention will be better understood from the following detailed description with reference to the single accompanying FIGURE which is a schematic sectional view of the optical, temporal bandpass filter.

A cone of light 8 from an optical light image producing device (not shown), such as a thermooptic FLIR, is polarized by front linear polarizer 10 in the vertical direction and is focused to an image on the partially transparent photoconductive layer 16 of the front liquid crystal cell 80. The cone of light 8 is representative of the optical light image which is produced in time based modulation by, as examples, a flat scanning mirror or a modulating (zooming) telescopic focusing of a scene being viewed. The cone of light diverges from layer 16 and is again converged by relay lens 30 and focused on the partially transparent photoconductive layer 36 of the back liquid crystal cell 90 and then diverges from layer 36 through the back linear polarizer 60 which is horizontally polarized.

Front cell 80 will be explained herein as being the faster cell and having right handedness untwist and back cell 90 will be explained as the slower cell and having left handedness untwist, but the arrangement could be reversed in either or both. The important things to remember are that one cell does have a faster response time than the other and has opposite handedness twist but the two cells are matched in terms of degree of untwist relative to the original local image intensity. That is, the plane of polarization of the faster cell will vary locally with the light intensity distribution in the image and the change in the plane of polarization of the slower cell, if the slower cell has had time to respond, will react equally in the opposite direction.

Forward and rearward plane glass plates 12-24 and 32-44 respectively form the front and back liquid crystal light value cells 80 and 90. Deposited on the interior surfaces of these plane glass plates are forward and rearward transparent electrodes 14-22 and 34-42 respectively. Partially transparent photoconductive layers 16 and 36 are deposited on the interior surfaces respectively of layers 14 and 34. Forward and rearward thin alighment insulators 18-20 and 38-40, along with insulator shims 19 and 39, respectively enclose the liquid crystal materials 28 and 48 in the front and back cells. Means for applying field producing voltages across the twisted nematic liquid crystal light values is comprised of two different a.c. voltages, namely a.c. voltage sources 52 and 54 connected respectively across transparent electrodes 14-22 and 34-42. The field effects are applied across the combination of the partially transparent photoconductive layer and the twisted nematic liquid crystal cell. The a.c. voltages remain on during the operation of the bandpass filter device. Rotary untwist is effected by modulation of the optical light image which lowers the resistivity across the photoconductor layer on a localized basis due to the image intensity pattern which changes the field.

Cells 80 and 90 operate to control transmission of the optical light image in the following manner. The linearly polarized light that is focused on the photoconductive layer 16 of faster cell 80 changes the resistivity across the combination of the partially transparent photoconductive layer 16 and the twisted nematic liquid crystal cell 28 from a total resistivity without light thereacross of about $10^9$ $\Omega/cm^2$ down to about $10^3$ $\Omega/cm^2$ with local intense light impinging on layer 16. This drop in resistivity changes the field thereacross and further the amount of rotary untwist of the polarized optical light image by the right handedness untwist of the faster cell 80. All the optical light image within the time response of the faster cell 80 will be passed therethrough with rotary untwisting in the right handedness direction. This untwisting of the vertically polarized light in the right handedness direction will also pass through the slower time response back cell 90 uneffected until the action of cell 90 begins. The untwisted vertically polarized light will then pass through the horizontally polarized back polarizer 60 and on to some display device. However, after a very short time the fast time based modulation will be effected by the left handedness rotary untwisting in the slower time response back cell 90 that countertwists the right handedness untwisted of the optical light back into the vertically polarized direction. Since the optical light image exiting the slower cell 90 is vertically polarized, the horizontally polarized back polarizer 60 will totally block this portion of the optical light image.

It will be clear to one skilled in the art that transmission of various limited frequencies of light may be employed by the present invention and such variation are not to be regarded as a departure from the spirit and scope of the invention, and all such variation are intended to be included within the scope of the following claims.

I claim:
1. An optical, temporal bandpass filter device, said device comprising:

front and back linear polarizers having their directions of polarization orthogonal to each other;

front and back liquid crystal light valves positioned in optical alignment between said front and back polarizers with a relay lens in optical alignment between said front and back liquid crystal light valves to provide image focus therebetween, said front and back liquid crystal light valves having different times of responses and opposite handedness of rotary direction untwist with matching degrees of untwist relative to the original local light intensity distribution in an optical light image emitted from an optical image producing source;

means for applying different a.c. voltages across said front and back liquid crystal light valves to cause faster time-based modulation of untwist in the liquid crystal cell molecules of one of said front and back liquid crystal light valves, wherein said optical light image is linearly polarized by said front linear polarizer with the linearly polarized optical light image focused on said front liquid crystal light valve in which the plane of polarization of said linearly polarized optical image is untwisted in a rotary direction by said front liquid crystal light valve in one handedness direction and is simultaneously untwisted in a rotary direction in the opposite handedness direction by said back liquid crystal light valve wherein said plane of polarization varies according to said original local light intensity distribution wherein the untwisted optical light image impinges on said back linear polarizer with only the portion of the optical light image transmitted therethrough which has time response within the passband of the faster liquid crystal cell to become at least partially untwisted and which is above the passband of the slower liquid crystal cell which has not had time to start any opposite handedness of untwist to cancel the untwist in said faster liquid crystal cell.

2. An optical, temporal bandpass filter device as set forth in claim 1 wherein said front and back linear polarizers are linear dichroic polarizers and said front and back liquid crystal light valves are twisted nematic liquid crystal light valves each comprising:

forward and rearward plane glass plates forming liquid cells;

forward and rearward transparent electrodes on the interior surfaces of said glass plates;

a partially transparent photoconductive layer on the interior surface of said forward transparent electrode;

forward and rearward thin alighment insulator layers on said photoconductive layer and on the interior of said rearward transparent electrode, wherein walls of said thin alignment insulator layers are conditioned to give a homogeneous alignment of the surface molecules but are connected so there is 90° twist in alignment between the walls of each cell; and twisted nematic liquid crystal cell having a liquid crystal material therein which is nematic at room temperature and is homogeneously aligned in each cell with a 90° twist and is enclosed by said forward and rearward thin alignment insulator layers and insulator shims;

and wherein said means for applying different a.c. voltages across said front and back liquid crystal light valves is comprised of electrical connections to said transparent electrode to provide field effects across said partially transparent photoconductor layer and said twisted nematic liquid crystal cell.

3. An optical, temporal bandpass filter device as set forth in claim 2 wherein said faster twisted nematic liquid crystal cell is about 5 $\mu$m thick and the slower twisted nematic liquid crystal cell is 10 $\mu$m and more thick and wherein said means for supplying a.c. voltages is comprised of two a.c. voltage sources operating at between 20 to 100 volts rms wherein a 30 KH$_Z$ source is applied across the faster cell to provide a faster time response and a 10 KH$_Z$ source is applied across the much thicker, slower cell to provide a slower time response.

4. An optical, temporal bandpass filter device as set forth in claim 3 wherein said plane glass plates are made of optical glass free of stains and said thin alignment insulator layers are made of silicon oxide layers of a thickness of from 1000 Å to 5000 Å.

5. An otpical, temporal bandpass of filter device as set forth in claim 4 wherein said liquid crystal material is comprised of 4'-methoxybenzylidene-4-butylaniline (MBBA).

6. An optical, temporal bandpass filter device as set forth in claim 4 wherein said liquid crystal material is comprised of a binary of 60 mole percent 4'-methoxybenzylidene-4-butylaniline and 40 mole percent 4'-ethyoxygenzylidene-4-n-butylaniline (MBBA:EBBA).

7. An optical, temporal bandpass filter device as set forth in claim 4 wherein said liquid crystal material is comprised of ternary and quaternary mixtures of liquid crystals.

8. An optical, temporal bandpass filter device as set forth in claim 5 wherein said transparent electrodes are comprised of indium-tin-oxide.

9. An optical, temporal bandpass filter device as set forth in claim 5 wherein said transparent electrodes are comprised of tin-oxide.

10. An optical, temporal bandpass filter device as set forth in claim 8 wherein said photoconductor layers are comprised of cadmium-sulfide of from 2 $\mu$m to 12 $\mu$m thick.

11. An optical, temporal bandpass filter device as set forth in claim 8 wherein said photoconductor layers are comprised of cadmium-selenide of from 2 $\mu$m to 12 $\mu$m thick.

12. An optical, temporal bandpass filter device as set forth in claim 8 wherein said photoconductor layers are comprised of cadmium-selenide-sulfide of from 2 $\mu$m to 12 $\mu$m thick.

13. An optical, temporal bandpass filter device as set forth in claim 4 wherein said liquid crystal material is comprised of positive and negative nematic liquid crystals.

14. An optical, temporal bandpass filter device as set forth in claim 5 wherein said faster cell is the front liquid crystal light valve and said slower cell is the back liquid crystal light valve.

* * * * *